Jan. 30, 1934.   H. THORBURN   1,945,098
APPARATUS FOR AND PROCESS OF FORMING RESILIENT TIRES

Filed March 29, 1932

Inventor
H. Thorburn
by J Edw. Maybee
ATTY.

Patented Jan. 30, 1934

1,945,098

UNITED STATES PATENT OFFICE 1,945,098

APPARATUS FOR AND PROCESS OF FORMING RESILIENT TIRES

Hugh Thorburn, Toronto, Ontario, Canada

Application March 29, 1932. Serial No. 601,747

6 Claims. (Cl. 18—38)

This invention relates to tires made of rubber or similar material and of the non-pneumatic type in which are positioned a series of rows of supports extending transversely of the tire, and in which fabric or cord bands are positioned in the tire between the rows of supports.

My object is to devise an improved method of and apparatus for building up such tires which will simplify the manufacture and thus reduce the cost, and which at the same time will give the desired tension on the annular bands.

I attain my object by building up the tire of alternate bands of uncured rubber and fabric, placing the tire in a suitable mould having holes in at least one side corresponding with the holes desired in the tire and then projecting through said holes into the tire pointed cores or prongs. In forcing the cores home, the uncured rubber in the path of the cores is displaced by the cores and compressed into the spaces between the cores to form supports for the fabric bands, thus placing great tension upon the annular fabric bands.

Figure 1:
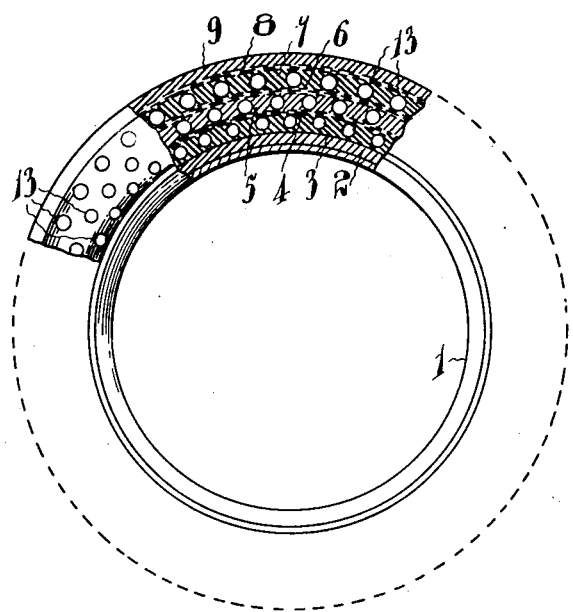
Figure 2:
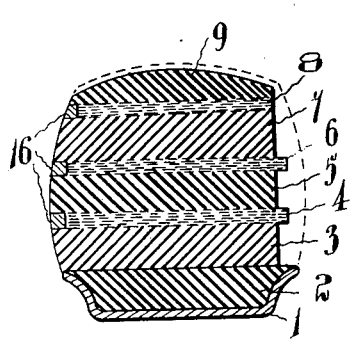

The invention is hereinafter more specifically described and illustrated in the accompanying drawing in which Fig. 1 is a side elevation, partly broken away showing a tire ready to be placed in a mould;

Fig. 2 a transverse section of the tire before the holes are formed; and

Figure 3:
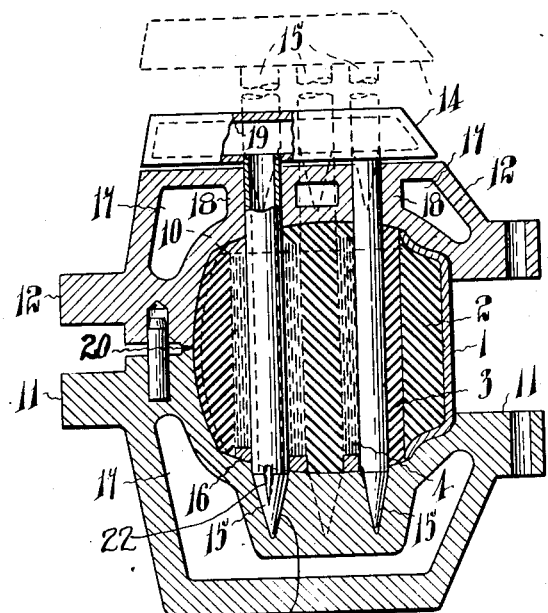

Fig. 3 a transverse section of a mould showing the tire in place therein.

In the drawing like numerals of reference indicate corresponding parts in the different figures.

The tire will preferably be built up on a metal rim 1, which may be of any suitable shape in cross section. The rim is filled up with an annular band 2 of uncured rubber. Superimposed on this is a band 3 of uncured rubber of considerable thickness. Superimposed on this band 3 is a band 4 of cord fabric or textile fabric having a sufficient number of plies to give the desired strength.

Superimposed on this fabric band 4 is a band 5 of uncured rubber and upon this band 5 is superposed another fabric band 6. Superimposed on the band 6 is a further band 7 of uncured rubber and upon it again is superimposed another fabric band 8.

Any number of pairs of bands of uncured rubber and fabric may be employed depending on the size of finished tire desired.

Superposed on the outer fabric band is the tread 9, also of uncured rubber.

For a purpose, which will hereinafter appear, the combined mass of fabric bands and bands of uncured rubber are not quite sufficient to fill up the mould. In building up the tire, see Fig. 2, the bands of uncured rubber will be arranged, at that side which is the underside when the tire is in the mould, to follow substantially the contour of the mould while the edges of the fabric bands will be set back, as it is not desirable for the fabric to be too close to the outside of the tire. The gaps formed by the setting back of the fabric bands will be filled in with suitably shaped strips 16 of uncured rubber. A gap will thus be left at the upper side of the mould above the dotted line 10 in Fig. 3. There will also be gaps at the tread portion of the mould formed by the recesses for the tread corrugations.

The mould itself is formed in two sections 11 and 12 between which the built up tire is received as shown in Fig. 3.

As stated in the preamble of the specification, the tire is of that type in which resiliency is secured through the provision in the tire of a plurality of rows of transversely extending supports and by putting the fabric bands under tension.

The supports are formed by piercing holes 13 through the uncured tire while in the mould so that the material is displaced within the mould by the piercing apparatus and not punched out. This may be done in the following manner.

In the upper mould section 12 are formed rows of holes or spaces between the support corresponding in size and number to the holes desired in the finished tire, and co-operating therewith is a prong carrying member 14 having prongs 15 corresponding in number and size to the holes in the mould section 12.

The prong-carrying member will be carried or operated by any suitable apparatus adapted to force the prongs 15 through the uncured rubber bands of the tire, the displaced rubber thus first filling up the upper part of the mould and then the tread part of the mould. As the movement of the displaced rubber is generally in the direction of the tread, this movement will have a tensioning effect on the bands as the tendency will be to carry the bands with the rubber, thus tending to stretch the bands. Sufficient rubber will be included in the bands that even with the mould completely filled, when the prongs have been forced home, there will be a compressing of the rubber in the mould. Any excess rubber over that sufficient to exert the desired tension on the fabric bands will escape through the division 20 between the mould sections 11 and 12, although in actual practice the amount of rubber required may be very closely estimated so that there will be very little escape to provide for.

The mould will preferably be of the type in which chambers 17 are formed in the sections for the vulcanizing steam, and tubular posts 18 will be provided in the mould sections for the passage of the prongs.

I also show the prongs 15 hollow so that steam to assist vulcanization may be applied therein. Steam may be supplied to the hollow prongs from a steam passage 19 in the prong-carrying member 14. If desired, however, the vulcanizing medium might be supplied to the prongs directly from the passages in the mould section 12.

As it is desirable that the holes in the tire between the supports should be of the same diameter throughout their length, it is necessary to provide recesses 21 in the mould section 11 to receive the pointed ends of the prongs 15.

While if the prongs 15 are sufficiently sharp pointed, it is not likely that they will tend to move material ahead of the prong, but only displace the same sidewise or laterally, there may be a tendency to move some material ahead of the prongs into the recesses 21 and to provide for the escape of any rubber in the recesses 21 which might interfere with the seating of the prongs the recesses are provided with one or more fine grooves 22 along which the rubber may travel back to the interior of the mould as the prongs seat.

As before stated, however, if the prongs are sufficiently sharply pointed, the movement of the rubber during piercing will be laterally with very little, if any, forward movement.

The prongs will remain in place during vulcanization of the tire, but will be subsequently withdrawn and the tire then removed from the mould. It will be noted from Fig. 1 that the supports in one row are arranged in staggered relationship to those in adjacent rows and the fabric bands must therefore be depended on to assist in carrying the load. Another feature is that at no point in the circumference of the tire is there a continuous support on a radial line from tread to rim, the tensioned bands thus receiving the road shocks instead of said shocks being imparted directly to the rim.

From the above description, it will be seen that I have devised a method and apparatus for constructing tires which will satisfactorily attain the object of my invention as set out in the preamble of this specification.

If desired, to give the tire greater resiliency, holes may be formed in a similar manner in the tread portion of the tire, such holes being preferably in staggered relationship to those in the adjacent row.

What I claim as my invention is:

1. In apparatus for forming resilient tires, the combination of a circumferentially divided mould, one of said mould sections having a plurality of rows of holes formed therein; prong carrying means, pointed hollow prongs carried by said means adapted to be projected through said holes into said mould, and means for supplying a vulcanizing medium to the interior of said prongs.

2. In apparatus for forming resilient tires, the combination of a circumferentially divided mould, one of said mould sections having a plurality of rows of holes formed therein; prong carrying means, pointed hollow prongs carried by said means adapted to be projected through said holes, the other of said mould sections having recesses formed therein to receive the pointed ends of said prongs, and means for supplying a vulcanizing medium to the interior of said prongs.

3. The method of forming resilient tires which comprises superimposing upon a rigid annular support an annular band of uncured rubber; superimposing upon the uncured rubber band an annular band formed mainly of fabric; enclosing said structure within a mould, forcing prongs through the uncured rubber transversely of the structure to compress the rubber and create a radially directed stress against the internal periphery of the fabric band; vulcanizing the structure with the prongs extending therethrough, and then withdrawing the prongs.

4. The method of forming resilient tires which comprises superimposing upon a rigid annular support a plurality of bands of uncured rubber and bands formed mainly of fabric, the bands of uncured rubber being alternated with the fabric bands; enclosing said structure within a mould; forcing prongs through the uncured rubber transversely of the structure to compress the rubber and create a radially directed stress against the internal periphery of the fabric bands, vulcanizing the structure with the prongs extending therethrough, and then withdrawing the prongs.

5. The method of forming resilient tires which comprises superimposing upon a rigid annular support an annular band of uncured rubber; superimposing upon the uncured rubber band an annular band formed mainly of fabric; applying annular partial tread outside the fabric band; enclosing said structure within a mould; forcing prongs through the uncured rubber transversely of the structure to displace a portion of the uncured rubber in said bands radially to complete the tread, and compress the remainder of the rubber to create a radially directed stress against the internal periphery of each fabric band, vulcanizing the structure with the prongs extending therethrough, and then withdrawing the prongs.

6. The method of forming resilient tires which comprises superimposing upon a rigid annular support a plurality of bands of uncured rubber and bands formed mainly of fabric, the bands of uncured rubber being alternated with the fabric bands; enclosing said structure within a mould of greater cross sectional area than the structure; forcing prongs through the uncured rubber transversely of the structure to first displace the rubber to fill the mould and then compress the rubber and create a radially directed stress against the internal periphery of the fabric bands, vulcanizing the structure with the prongs extending therethrough, and then withdrawing the prongs.

HUGH THORBURN.